(12) United States Patent
Wu

(10) Patent No.: US 10,684,635 B2
(45) Date of Patent: Jun. 16, 2020

(54) ILLUMINATION SYSTEM AND OPERATING METHOD THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventor: Bing-Yu Wu, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 60 days.

(21) Appl. No.: 15/996,751

(22) Filed: Jun. 4, 2018

(65) Prior Publication Data
US 2019/0018436 A1 Jan. 17, 2019

Related U.S. Application Data

(60) Provisional application No. 62/532,419, filed on Jul. 14, 2017.

(30) Foreign Application Priority Data

Mar. 16, 2018 (CN) .......................... 2018 1 0218961

(51) Int. Cl.
| | | |
|---|---|---|
| *G05D 25/02* | (2006.01) | |
| *F21V 14/00* | (2018.01) | |
| *H04N 5/225* | (2006.01) | |
| *G06K 9/00* | (2006.01) | |
| *G06K 9/20* | (2006.01) | |
| *H05B 47/105* | (2020.01) | |

(52) U.S. Cl.
CPC .......... *G05D 25/02* (2013.01); *F21V 14/003* (2013.01); *G06K 9/00315* (2013.01); *G06K 9/2027* (2013.01); *H04N 5/2256* (2013.01); *H05B 47/105* (2020.01); *G06K 9/00228* (2013.01); *G06T 2207/30201* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,261,015 A | * | 11/1993 | Glasheen | G02B 6/356 385/23 |
| 2017/0249501 A1 | * | 8/2017 | Van der Sijde | G06K 9/00255 |
| 2019/0187539 A1 | * | 6/2019 | Salmimaa | H04N 5/2256 |

* cited by examiner

*Primary Examiner* — Janese Duley
(74) *Attorney, Agent, or Firm* — McClure, Qualey & Rodack, LLP

(57) ABSTRACT

An illumination system and an operating method thereof are provided. The illumination system includes a light source defining a illumination range, an image capturing device for obtaining an image within the illumination range, an optical channel switch assembly including optical channel switches forming an array, a computing unit, and a driving unit. When a physiological characteristic is detected in the image, the computing unit obtains a controlling region of the array corresponding to a position of the physiological characteristic located in the image, and commands the driving unit to control a light passing amount of at least a portion of the optical channel switches located in the controlling region.

11 Claims, 7 Drawing Sheets

ILLUMINATION SYSTEM AND OPERATING METHOD THEREOF

This application claims the benefit of U.S. Provisional Application No. 62/532,419, filed Jul. 14, 2017, and the benefit of People's Republic of China patent application Ser. No. 201810218961.8, filed Mar. 16, 2018, the invention of which are incorporated by reference herein in its entirety.

TECHNICAL FIELD

The invention relates in general to an illumination system and an operating method thereof, and more particularly to an illumination system and an operating method thereof which can be used to suppress the glare.

BACKGROUND

Illumination equipment has become an indispensable and important device in our daily lives, and is also widely used in various occasions. However, it is easy to generate the glare under high intensity of radiation. When the light with high intensity directly shines onto human eyes, it is likely to make eyes uncomfortable.

Generally, to improve the glare problem, a lampshade is added to the outer of the lamp to diffuse and homogenize the light. Thus, the light may become soft and does not irritate human eyes. However, using this method to suppress the glare may change the overall illumination characteristics of the lamp, such as the light shape, and may also excessively lower the illumination brightness.

SUMMARY

The invention is directed to an illumination system and an operating method thereof to solve the problem of glare without destroying the overall illumination characteristics of the lamp and excessively lowering the illumination brightness.

According to one embodiment, an illumination system is provided. The illumination system includes a light source, an image capturing device, an optical channel switch assembly, a computing unit and a driving unit. The light emitted from the light source defines an illumination range. The image capturing device is configured to obtain an image within the illumination range. The optical channel switch assembly is disposed in at least a portion of optical path of the light emitted from the light source, and the optical channel switch assembly includes a plurality of optical channel switches forming an optical channel switch array. The computing unit is configured to determine whether there is a physiological characteristic in the image. The driving unit is configured to control a light passing amount of the optical channel switches. When the computing unit determines there is the physiological characteristic in the image, the computing unit obtains a position of the physiological characteristic located in the image, obtains a controlling region of the optical channel switch array corresponding to the position, and commands the driving unit to control the light passing amount of at least a portion of the optical channel switches located in the controlling region.

According to another embodiment, an operating method of an illumination system is provided. The illumination system includes a light source and an optical channel switch assembly. The light emitted from the light source defines an illumination range. The optical channel switch assembly is disposed in at least a portion of optical path of the light emitted from the light source, and includes a plurality of optical channel switches forming an optical channel switch array. The operating method includes the following steps. Obtain an image within the illumination range. Determine whether there is a physiological characteristic in the image. When it is determined that there is the physiological characteristic in the image, a position of the physiological characteristic located in the image is obtained, a controlling region of the optical channel switch array corresponding to the position is obtained, and at least a portion of the optical channel switches located in the controlling region is controlled to reduce an illumination quantity of light passing through the controlling region.

Figure 1:
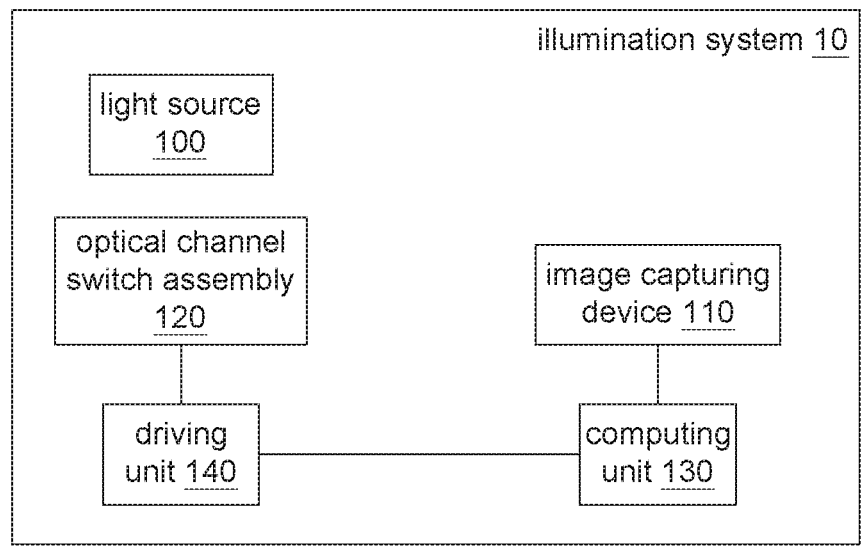
FIG. 1 shows a block diagram of an illumination system according to one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Detailed descriptions of the present invention are disclosed below with a number of embodiments. Although the present invention does not illustrate all possible embodiments, other embodiments not disclosed in the present invention are still applicable. Moreover, the dimension scales used in the accompanying drawings are not based on actual proportion of the product. Therefore, the specification and drawings are for explaining and describing the embodiment only, not for limiting the scope of protection of the present invention. Furthermore, in the drawings of the embodiments, some elements are omitted so that technical features of the present invention can be clearly illustrated. Designations common to the accompanying drawings and embodiments are used to indicate identical or similar elements.

Referring to FIG. 1, a block diagram of an illumination system 10 according to one embodiment of the present invention is shown. The illumination system 10 may include a light source 100, an image capturing device 110, an optical channel switch assembly 120, a computing unit 130 and a driving unit 140. The light source 100 may be a point light source or a planar light source. The point light source may be, for example, a Light-Emitting Diode (LED) or a laser. The planar light source may be, for example, an array which includes a plurality of point light sources. The image capturing device 110 is configured to obtain an image, such as a camera, a video camera, monitor and the like. The optical channel switch assembly 120 includes a plurality of optical channel switches. The optical channel switches are, for example, arranged in an array to form an optical channel switch array. Each optical channel switch may respectively be controlled so as to change the light passing amount of each optical channel switch. The driving unit 140 is coupled to the optical channel switch assembly 120 and is configured to control the light passing amounts of these optical channel switches.

For example, in a condition that the light emitted from the light source 100 firstly irradiates to the optical channel switch assembly 120 before emitted out of the illumination system 10, if an optical channel switch is switched "on", the light projected to the optical channel switch may completely pass through the optical channel switch to be emitted out of the illumination system 10. In this case, the light passing amount of the optical channel switch may be, for example, 100%. If an optical channel switch is switched "off", the light projected to the optical channel switch cannot pass through the optical channel switch and cannot be emitted out of the illumination system 10. In this case, the light passing amount of the optical channel switch may be, for example, 0%. If an optical channel switch is switched "half-on", only a portion of the light projected to the optical channel switch may pass through the optical channel switch to be emitted out of the illumination system 10. In this case, the light passing amount of the optical channel switch may be, for example, 30% or 60%. The light passing amount of the optical channel switch in the present invention is not limited to the above-mentioned percentages. Instead, the driving unit 140 may control these optical channel switches to generate different light passing amounts.

The computing unit 130 is coupled to the image capturing device 110 and the driving unit 140. The computing unit 130 is, for example, a processor. The computing unit 130 is configured to compute the image obtained by the image capturing device 110 so as to recognize a physiological characteristic in the image, such as a human face, a pupil of human eyes and so on. For example, the computing unit 130 may recognize a physiological characteristic of a human face in the image. Furthermore, the computing unit 130 is also configured to command the driving unit 140 to control the light passing amount of each optical channel switch of the optical channel switch assembly 120. For example, the computing unit 130 may command the driving unit 140 to independently control each optical channel switch to be switched "on", switched "off", or switched "half-on". That is, the light passing amount of each optical channel switch may be controlled to be between 0%-100%.

Specifically, the computing unit 130 may compute the image obtained by the image capturing device 110 to recognize the physiological characteristic in the image, obtain a position of the recognized physiological characteristic located in the image, and obtain a controlling region of the optical channel switch array corresponding to the position of the recognized physiological characteristic located in the image. Here, the controlling region of the optical channel switch array will be a region of the optical channel switch array which the light of the light source passes through and is projected to the physiological characteristic. The computing unit 130 may obtain the controlling region of the optical channel switch array according to the position of the recognized physiological characteristic located in the image. After the controlling region of the optical channel switch array is obtained, the computing unit 130 may command the driving unit 140 to control the light passing amount of at least a portion of the optical channel switches located in the controlling region. For example, at least a portion of the optical channel switches located in the controlling region is switched "off" or switched "half-on", so as to block the light from passing through the at least a portion of the optical channel switches or reduce the light that can pass through the at least a portion of the optical channel switches and be emitted out of the illumination system 10.

Figure 2:
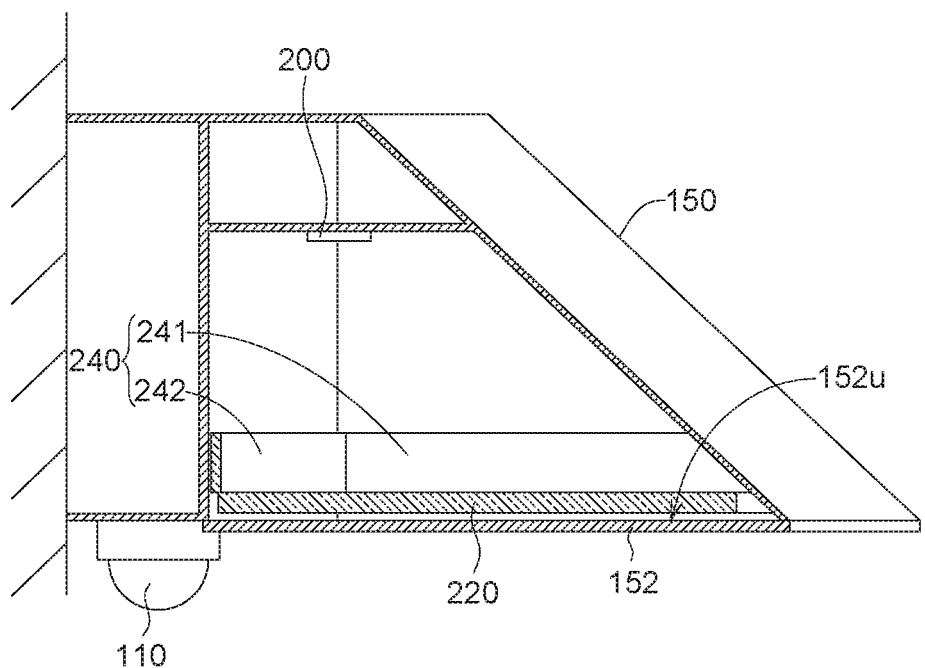
FIG. 2 shows a side cross-sectional view of an illumination system according to one embodiment of the present invention.
Figure 4A:
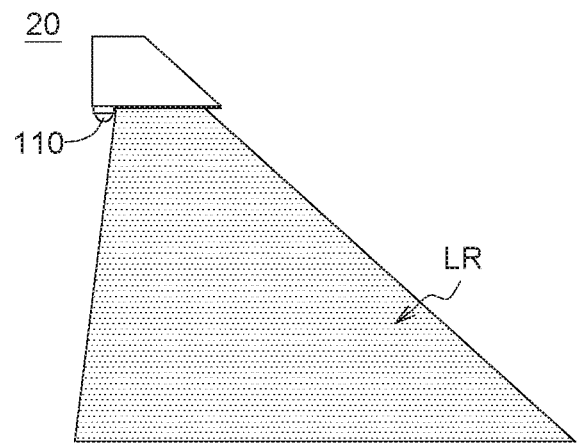
FIG. 4A is a schematic diagram showing the illumination system of FIG. 2 in a side view.

Referring to FIG. 2, a side cross-sectional view of an illumination system 20 according to one embodiment of the present invention is shown. The operating method of the illumination system 20 is similar to that of the illumination system 10, and common or similar designations are used to indicate similar elements. As shown in FIG. 2, the illumination system 20 includes a housing 150, a light source 200, an image capturing device 110, an optical channel switch assembly 220 and a driving unit 240. The housing 150 may include an optically transmissive bottom case 152. The light source 200 is disposed opposite to the optically transmissive bottom case 152. The optically transmissive bottom case 152 may be a lens or a protection layer. The light emitted from the light source 200 may pass through the optically transmissive bottom case 152 to be emitted out of the illumination system 20. After the light emitted from the light source 200 is emitted out of the illumination system 20, the light may define an illumination range LR, as shown in FIG. 4A.

In the embodiments of the present invention, the optical channel switch assembly 220 is disposed in the optical path of the light emitted from the light source 200 and overlapped with at least a portion of the area of the optical path. In other words, of all the light emitted from the light source 200, at least a portion of light passes through the optical channel switch assembly 220 first, and is then emitted out of the illumination system 20.

In the embodiment of FIG. 2, the optically transmissive bottom case 152 has an upper surface 152u, which is a surface facing the light source 200. The optical channel switch assembly 220 may be disposed on the upper surface 152u of the optically transmissive bottom case 152. In the present embodiment, the optical channel switch assembly 220 covers the upper surface 152u of the optically transmissive bottom case 152 over a large area, so that the upper surface 152u of the optically transmissive bottom case 152 is almost covered by the optical channel switch assembly 220. In other words, the light emitted from the light source 200 may pass through the optical channel switch assembly 220 first, and is then emitted out of the illumination system 20 through the optically transmissive bottom case 152. Thus, by controlling the light passing amounts of related optical channel switches of the optical channel switch assembly 220, the illumination system 20 can control an illumination quantity of light emitted out of the illumination system 20. In other words, the illumination quantity in different areas of the illumination range LR may be different due to different states of the optical channel switches (such as switched "on", switched "off", and switched "half-on").

In one embodiment, the optical channel switch assembly 220 may be a liquid-crystal panel. The driving unit 240 may be a driving circuit board configured to drive the liquid-crystal panel. In this case, the optical channel switches of the optical channel switch assembly 220 are arranged in an array to form an optical channel switch array, and each optical channel switch may respectively correspond to one pixel structure of the liquid-crystal panel. The driving unit 240 may include a first portion 241 and a second portion 242 for respectively driving the rows and columns of electrodes of the upper and lower substrates of the liquid-crystal panel, such that the liquid crystal between the electrodes of the upper and lower substrates can be twisted. Once the liquid crystal is twisted, the light emitted from the light source 200 may be allowed to pass through the pixel structure where the twisted liquid crystal is, representing that the optical channel switch corresponding to this pixel structure is switched "on". On the contrary, if the liquid crystal is not twisted, the light emitted from the light source 200 are not allowed to pass through the pixel structure where the non-twisted liquid crystal is, representing that the optical channel switch corresponding to this pixel structure is switched "off". Or, the liquid crystal may be twisted in a specific angle, so that a portion of light emitted from the light source 200 is allowed to pass through the pixel structure where the twisted liquid crystal is, representing that the optical channel switch corresponding to this pixel structure is switched "half-on". However, the present invention is not limited thereto.

Figure 3:
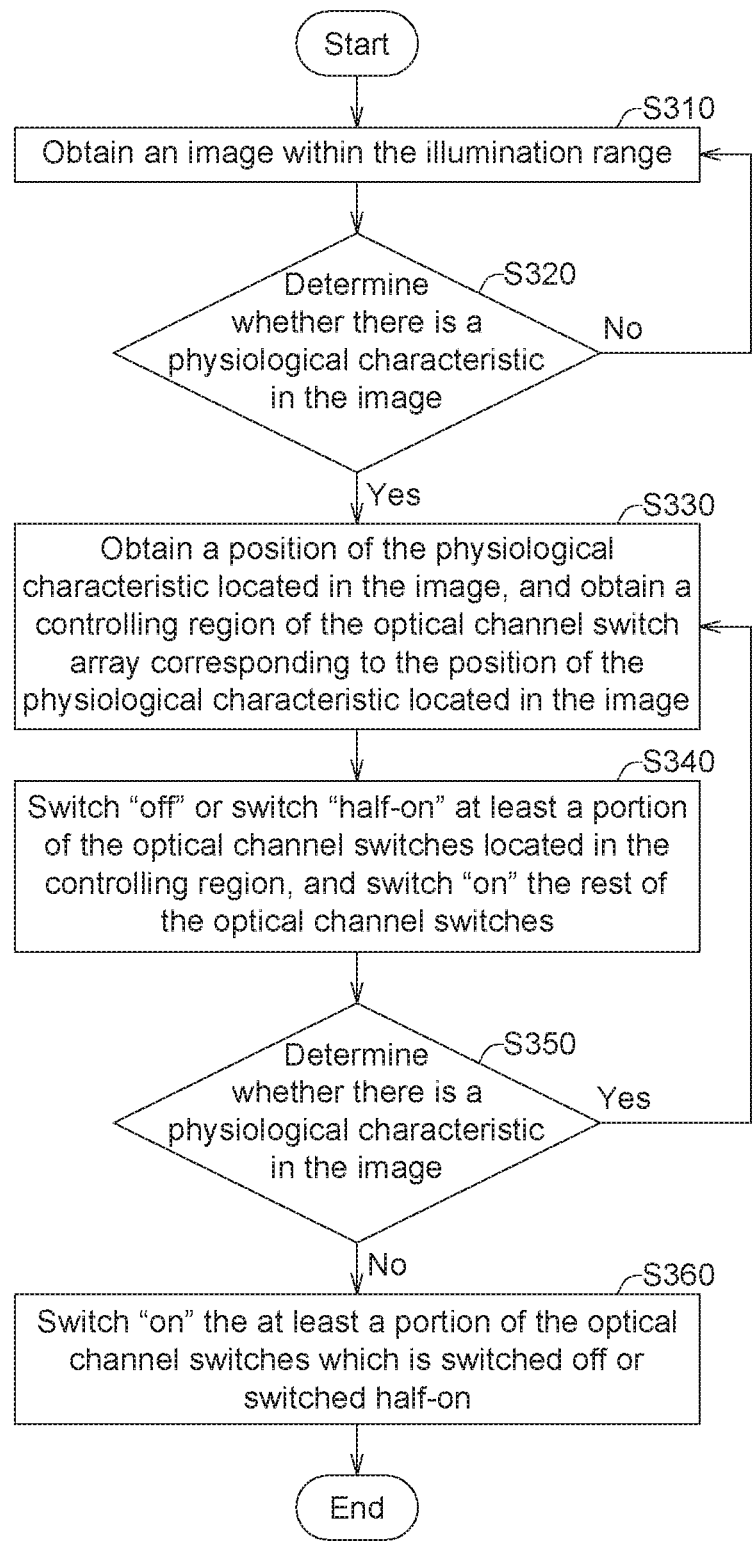
FIG. 3 shows a flow chart of an operating method of the illumination system according to one embodiment of the present invention.
Figure 4B:
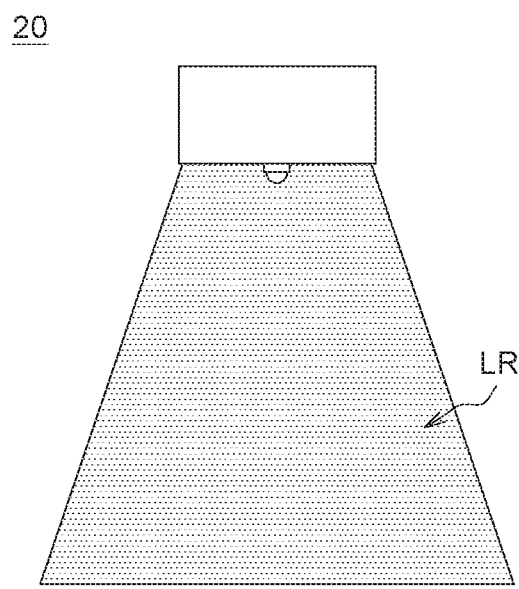
FIG. 4B is a schematic diagram showing the illumination system of FIG. 2 in a rear view.
Figure 4C:
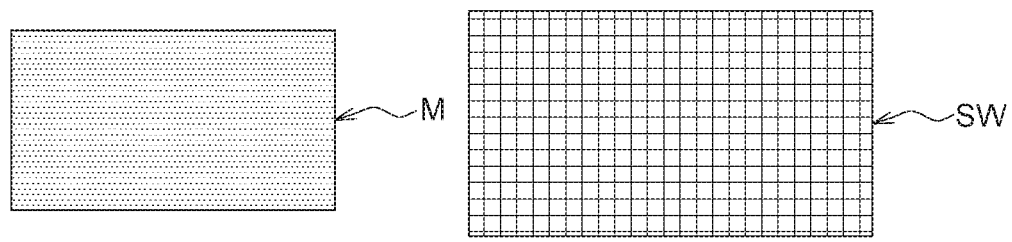
FIG. 4C is a schematic diagram showing the image obtained by the image capturing device and the optical channel switch array of the optical channel switch assembly in a condition of FIG. 4A and FIG. 4B.
Figure 5A:
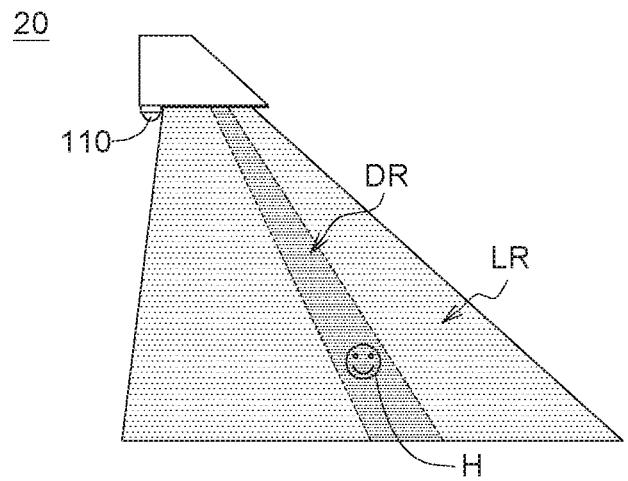
FIG. 5A is a schematic diagram showing a condition when a person passes by the illumination range of the illumination system of FIG. 2 in a side view.
Figure 5B:
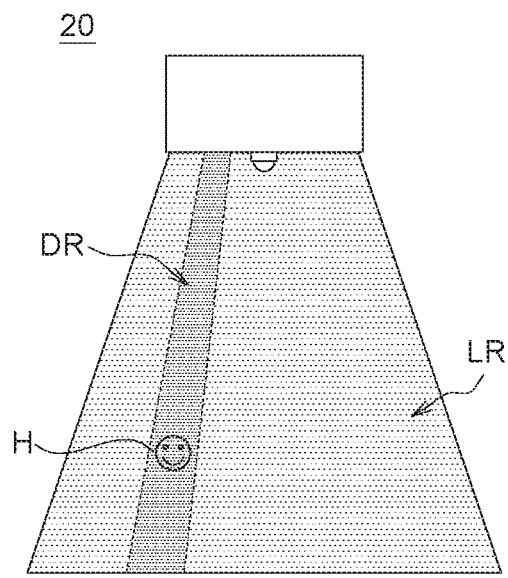
FIG. 5B is a schematic diagram showing a condition when a person passes by the illumination range of the illumination system of FIG. 2 in a rear view.
Figure 5C:
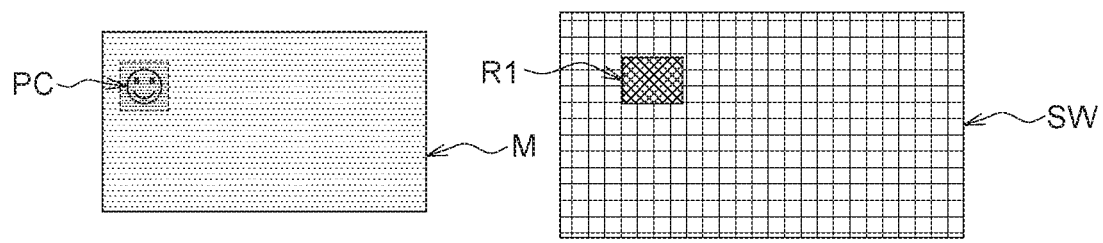
FIG. 5C is a schematic diagram showing the image obtained by the image capturing device and the optical channel switch array of the optical channel switch assembly in a condition of FIG. 5A and FIG. 5B.

FIG. 3 shows a flow chart of an operating method of the illumination system according to one embodiment of the present invention. FIG. 4A is a schematic diagram showing the illumination system 20 of FIG. 2 in a side view. FIG. 4B is a schematic diagram showing the illumination system 20 of FIG. 2 in a rear view. FIG. 4C is a schematic diagram showing the image M obtained by the image capturing device 110 and the optical channel switch array SW of the optical channel switch assembly 220 in a condition of FIG. 4A and FIG. 4B. FIG. 5A is a schematic diagram showing a condition when a person H passes by the illumination range LR of the illumination system 20 of FIG. 2 in a side view. FIG. 5B is a schematic diagram showing a condition when a person H passes by the illumination range LR of the illumination system 20 of FIG. 2 in a rear view. FIG. 5C is a schematic diagram showing the image M obtained by the image capturing device 110 and the optical channel switch array SW of the optical channel switch assembly 220 in a condition of FIG. 5A and FIG. 5B. In the following detailed description, the operation among the above-mentioned elements are described with FIG. 4A, FIG. 4B, FIG. 4C, FIG. 5A, FIG. 5B and FIG. 5C also with the block diagram of FIG. 1 and the flow chart of FIG. 3.

First, in step S310, the image capturing device 110 obtains an image M within the illumination range LR. In step S320, the computing unit 130 computes and recognizes the image M so as to determine whether there is a physiological characteristic PC in the image M. When it is determined that there is no physiological characteristic PC in the image M, it may represent that there is no person appearing in the illumination range LR, and the step goes back to step S310. When it is determined that there is a physiological characteristic PC in the image M, step S330 is performed.

As shown in FIG. 4A and FIG. 4B, the light emitted from the light source 200 defines an illumination range LR. When there is no person appearing in the illumination range LR, the image M obtained by the image capturing device 110 shows no physiological characteristic, as shown in FIG. 4C. When the computing unit 130 computes and recognizes the image M, the computing unit 130 may determine there is no physiological characteristic PC in the image M. At this time, the optical channel switches of the optical channel switch assembly 220 are switched "on".

On the contrary, when it is determined that there is a physiological characteristic PC in the image M, that is, as shown in FIG. 5A, FIG. 5B and FIG. 5C, when a person H appears in the illumination range LR, the image M shows a physiological characteristic PC. When the computing unit 130 computes and recognizes the image M, the computing unit 130 may determine there is a physiological characteristic PC in the image M. Then, step S330 is performed. In step S330, the computing unit 130 obtains a position of the physiological characteristic PC located in the image M, and obtains a controlling region R1 of the optical channel switch array SW corresponding to the position of the physiological characteristic PC located in the image M. For example, the computing unit 130 may use the projecting information from the human face to the light source 200 to derive the controlling region R1 of the optical channel switch array SW, wherein of all the light emitted from the light source 200, the light projected onto the human face passes through the controlling region R1.

Afterwards, step S340 is performed. In step S340, the computing unit 130 commands the driving unit 240 to control at least a portion of the optical channel switches located in the controlling region R1 of the optical channel switch array SW. More specifically, the computing unit 130 commands the driving unit 240 to switch "off" or switch "half-on" at least a portion of the optical channel switches located in the controlling region R1, while the rest of the optical channel switches remain to be switched "on". The at least a portion of the optical channel switches located in the controlling region R1 being switched "off" or switched "half-on" may block or reduce the light being emitted out of the illumination system 20. Thus, the illumination quantity of light passing through the controlling region R1 may be reduced. Of all the light emitted from the light source 200, the light passing through the controlling region R1 may be projected onto the human face. Therefore, when the illumination quantity of light passing through the controlling region R1 is reduced, the illumination quantity of light being projected onto the human face is also reduced, resulting in a relatively dark zone DR that is projected onto the human face. Accordingly, it may suppress the glare without destroying the overall illumination characteristics.

In one embodiment, the computing unit 130 may adjust or set the ratio of the optical channel switches located in the controlling region R1 which are switched "off" or switched "half-on". For example, the computing unit 130 may command the driving unit 240 to switch "off" or switch "half-on" all of the optical channel switches located in the controlling region R1. In one example, the computing unit 130 may switch "off" or switch "half-on" at least 10% of the optical channel switches located in the controlling region R1. In another example, the computing unit 130 may switch "off" or switch "half-on" about 30%-100% of the optical channel switches located in the controlling region R1. In still another example, the optical channel switches may be controlled in stages. For example, the driving unit 240 may gradually switch "off" or switch "half-on" these optical channel switches instead of simultaneously switching "off" or switching "half-on" these optical channel switches.

Next, as shown in step S350, the computing unit 130 may keep computing and recognizing the image M obtained by the image capturing device 110 so as to determine whether there is a physiological characteristic PC in the image M. If there is still a physiological characteristic PC in the image M, it may represent that the person H may still be located in the illumination range LR, or move in the illumination range LR. In this condition, the step goes back to step S330, so as to update a corresponding controlling region of the optical channel switch array SW, and switch "off" or switch "half-on" at least a portion of the optical channel switches located in the controlling region (step S340). Therefore, the position of the dark zone DR may be varied according to the position of the person H.

On the contrary, in step S350, when it is determined that there is no physiological characteristic PC in the image M, it may represent that the person H has left the illumination range LR, and then step S360 is performed. In step S360, the computing unit 130 commands the driving unit 240 to switch "on" the above-mentioned at least a portion of the optical channel switches which is switched off or switched half-on.

In the above embodiments, it takes one single person entering the illumination range LR as an example. However, the method of the present invention may also be applied to a condition of plural persons. When lots of persons enter the illumination range LR, the computing unit 130 may determine whether there are plural physiological characteristics PC in the image M, obtain positions of these physiological characteristics PC located in the image M, and obtain corresponding controlling regions located in the optical channel switch array SW, so as to switch "off" or switch "half-on" at least a portion of the optical channel switches located in the controlling regions.

Figure 6:
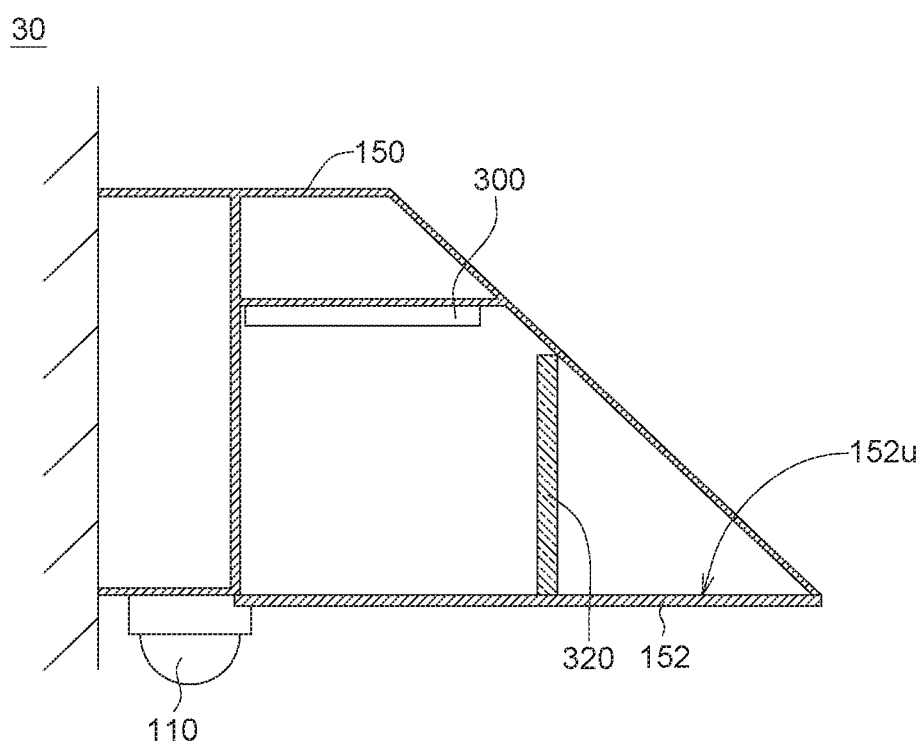
FIG. 6 shows a side cross-sectional view of an illumination system according to another embodiment of the present invention.

Referring to FIG. 6, a side cross-sectional view of an illumination system 30 according to another embodiment of the present invention is shown. The operating method of the illumination system 30 is similar to that of the illumination system 20, and common or similar designations are used to indicate similar elements. The difference between the illumination system 30 as shown in FIG. 6 and the illumination system 20 as shown in FIG. 2 is the way to dispose the optical channel switch assembly 320, and other similar part will not be repeated here again.

Since the glare may usually take place near the boundary of the illumination range LR, it may also suppress the glare by reducing the illumination quantity of light which is emitted to a place near the boundary of the illumination range LR. In the present embodiment, the optical channel switch assembly 320 may be disposed in an optical path of the light that has a large light emission angle of the light source 300. As shown in FIG. 6, the optical channel switch assembly 320 may be vertically disposed on the upper surface 152*u* of the optically transmissive bottom case 152, and disposed in the optical path of the light of the light source 300 which is emitted towards the boundary of the illumination range LR. In other words, of all the light emitted from the light source 300, only the light emitted towards the boundary of the range illumination LR passes through the optical channel switch assembly 320 first, and is then emitted out of the illumination system 30 through the optically transmissive bottom case 152. Thus, the illumination system 30 may adjust the illumination quantity of light emitted towards the boundary of the illumination range LR by controlling the light passing amount of the optical channel switches of the optical channel switch assembly 320. In the present embodiment, the light source 300 may be a point light source or a planar light source. In FIG. 6, the light source 300 is a planar light source as an example; however, the present invention is not limited thereto.

Figure 7A:
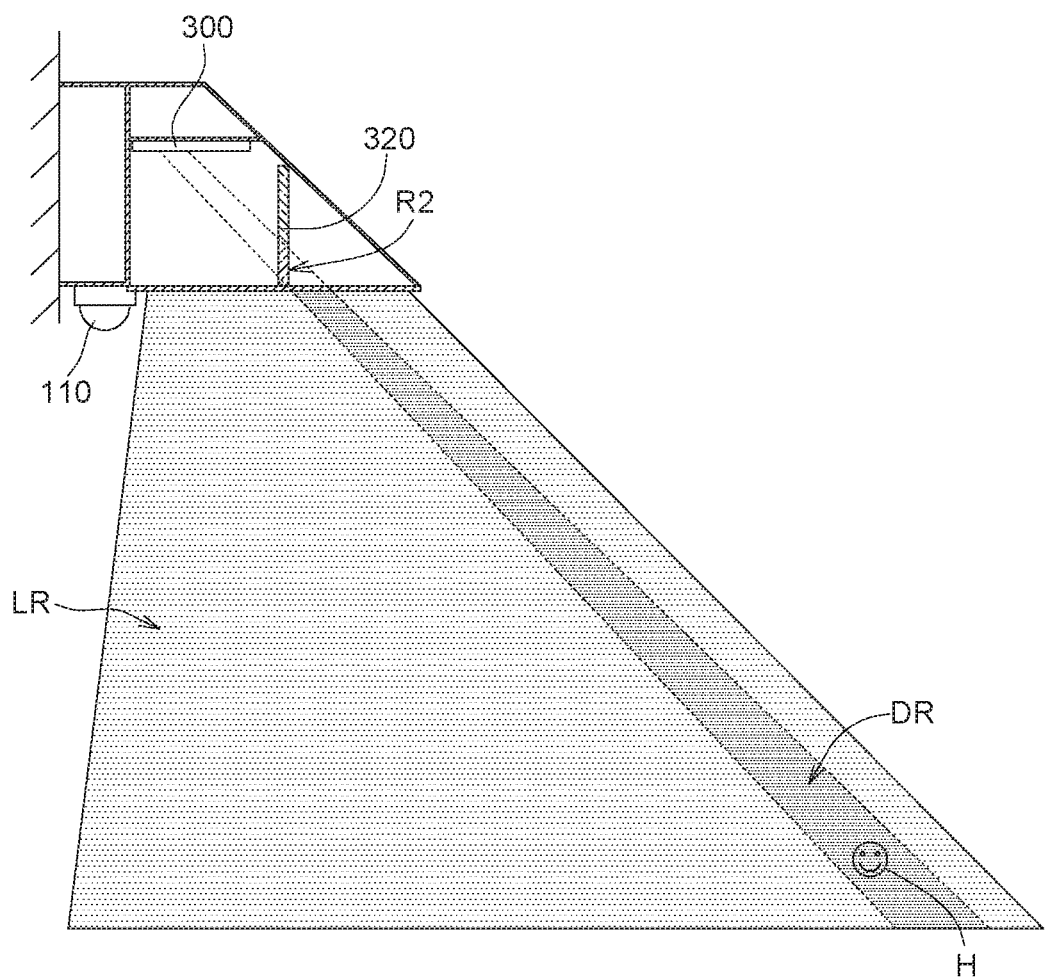
FIG. 7A is a schematic diagram showing a condition when a person passes by the illumination range of the illumination system of FIG. 6 in a side view.
Figure 7B:
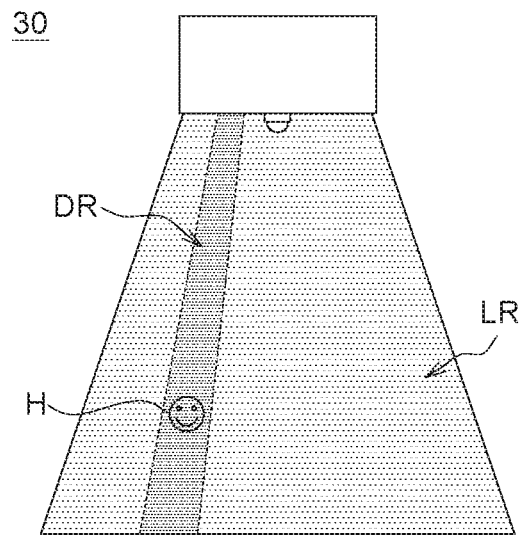
FIG. 7B is a schematic diagram showing a condition when a person passes by the illumination range of the illumination system of FIG. 6 in a rear view.
Figure 7C:
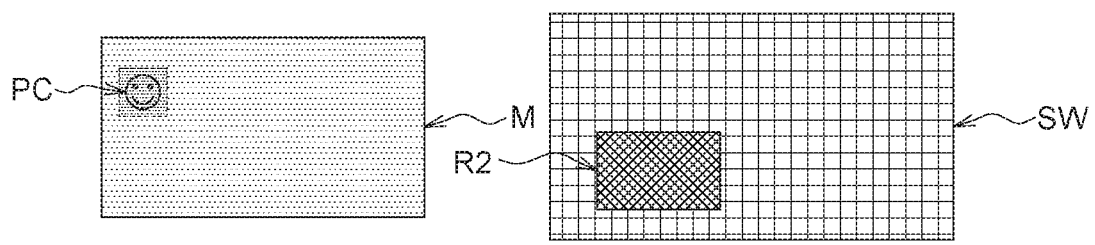
FIG. 7C is a schematic diagram showing the image obtained by the image capturing device and the optical channel switch array of the optical channel switch assembly in a condition of FIG. 7A and FIG. 7B.

FIG. 7A is a schematic diagram showing a condition when a person H passes by the illumination range LR of the illumination system 30 of FIG. 6 in a side view. FIG. 7B is a schematic diagram showing a condition when a person H passes by the illumination range LR of the illumination system 30 of FIG. 6 in a rear view. FIG. 7C is a schematic diagram showing the image M obtained by the image capturing device 110 and the optical channel switch array SW of the optical channel switch assembly 320 in a condition of FIG. 7A and FIG. 7B.

As shown in FIG. 7A, FIG. 7B and FIG. 7C, when a person H appears in the illumination range LR, the image M shows a physiological characteristic PC. When the computing unit 130 computes and recognizes the image M, the computing unit 130 may determine there is a physiological characteristic PC in the image M (step S320). Next, the computing unit 130 obtains a position of the physiological characteristic PC located in the image M, and obtains a controlling region R2 of the optical channel switch array SW corresponding to the position of the physiological characteristic PC located in the image M (step S330). Then, the computing unit 130 commands the driving unit 140 to switch "off" or switch "half-on" at least a portion of the optical channel switches located in the controlling region R2, while the rest of the optical channel switches remain to be switched "on" (step S340). The at least a portion of the optical channel switches located in the controlling region R2 being switched "off" or switched "half-on" may block or reduce the light being emitted out of the illumination system 30. Thus, the illumination quantity of light passing through the controlling region R2 may be reduced. Of all the light emitted from the light source 300, the light passing through the controlling region R2 may be projected onto the human face. Therefore, when the illumination quantity of light passing through the controlling region R2 is reduced, the illumination quantity of light being projected onto the human face is also reduced, resulting in a relatively dark zone DR that is projected onto the human face. Accordingly, it may suppress the glare without destroying the overall illumination characteristics.

According the illumination systems provided in the above embodiments, the position of a physiological characteristic located in the image may be tracked and a controlling region of the optical channel switch array corresponding to the position of the physiological characteristic located in the image may be obtained by an optical channel switch assembly, an image capturing device and a computing unit. Furthermore, the illumination quantity of light passing through the controlling region may be reduced by controlling the light passing amount of at least a portion of the optical channel switches located in the controlling region, for example, by switching "off" or switching "half-on" the at least a portion of the optical channel switches located in the controlling region. More specifically, it may suppress the glare by reducing the illumination quantity of light which is projected onto human face. Moreover, under such a configuration, the predefined illumination characteristics may further be maintained.

It will be apparent to those skilled in the art that various modifications and variations can be made to the disclosed embodiments. It is intended that the specification and examples be considered as exemplary only, with a true scope of the invention being indicated by the following claims and their equivalents.

What is claimed is:

1. An illumination system comprising:
   a light source for emitting light defining an illumination range;
   an image capturing device configured to obtain an image within the illumination range;
   an optical channel switch assembly disposed in at least a portion of optical path of the light emitted from the light source, the optical channel switch assembly comprising a plurality of optical channel switches forming an optical channel switch array, the light emitted from the light source projected to the optical channel switch array passes through the optical channel switch array to be emitted out of the illumination system, and each of the optical channel switches is controlled to have a light passing amount; and
   a computing unit configured to determine whether there is a physiological characteristic in the image;
   wherein when the computing unit determines there is the physiological characteristic in the image, the computing unit obtains a position of the physiological characteristic located in the image, obtains a controlling region of the optical channel switch array corresponding to the position, and commands to change the light passing amount of at least a portion of the optical channel switches located in the controlling region among at least three different ratios.

2. The illumination system according to claim 1, wherein when the computing unit determines there is the physiological characteristic in the image, the computing unit commands to control at least 10% of the optical channel switches located in the controlling region to reduce the light passing amount of the at least 10% of the optical channel switches located in the controlling region.

3. The illumination system according to claim 1, wherein the optical channel switch assembly is a liquid-crystal panel.

4. The illumination system according to claim 1, further comprising a housing comprising an optically transmissive bottom case, wherein the optical channel switch assembly covers the optically transmissive bottom case.

5. The illumination system according to claim 1, wherein the optical channel switch assembly is disposed in the optical path of the light emitted from the light source to a boundary of the illumination range.

6. The illumination system according to claim 1, wherein the light passing amount of the at least a portion of the optical channel switches located in the controlling region is gradually controlled.

7. The illumination system according to claim 1, wherein the physiological characteristic is a human face or a pupil of human eyes.

8. The illumination system according to claim 1, wherein the light of the light source projected to the physiological characteristic passes through the controlling region of the optical channel switch array.

9. An operating method of an illumination system comprising a light source and an optical channel switch assembly, the light source emitting light defining an illumination range, the optical channel switch assembly disposed in at least a portion of optical path of the light emitted from the light source and comprising a plurality of optical channel switches forming an optical channel switch array, each of the optical channel switches being controlled to have a light passing amount, the operating method comprising:
   obtaining an image within the illumination range; and
   determining whether there is a physiological characteristic in the image;
   wherein when it is determined that there is the physiological characteristic in the image, a position of the physiological characteristic located in the image is obtained, a controlling region of the optical channel switch array corresponding to the position is obtained, and at least a portion of the optical channel switches located in the controlling region is controlled to change the light passing amount among at least three different ratios to reduce an illumination quantity of light passing through the controlling region,
   wherein the light emitted from the light source projected to the optical channel switch array passes through the optical channel switch array to be emitted out of the illumination system.

10. The operating method according to claim 9, wherein when it is determined that there is the physiological characteristic in the image, at least 10% of the optical channel switches located in the controlling region are controlled to reduce the light passing amount of the at least 10% of the optical channel switches located in the controlling region.

11. The operating method according to claim 9, wherein when it is determined that there is the physiological characteristic in the image, the light passing amount of the at least a portion of the optical channel switches located in the controlling region is gradually controlled.

* * * * *